United States Patent
Hansen

(10) Patent No.: US 9,495,601 B2
(45) Date of Patent: Nov. 15, 2016

(54) DETECTING AND REPORTING IMPROPER ACTIVITY INVOLVING A VEHICLE

(71) Applicant: Mirsani, LLC, Atlanta, GA (US)

(72) Inventor: Eric Anthony Hansen, Atlanta, GA (US)

(73) Assignee: Mirsani, LLC, Atlanta, GA (US)

( * ) Notice: Subject to any disclaimer, the term of this patent is extended or adjusted under 35 U.S.C. 154(b) by 202 days.

(21) Appl. No.: 14/191,743

(22) Filed: Feb. 27, 2014

(65) Prior Publication Data

US 2015/0161464 A1 Jun. 11, 2015

Related U.S. Application Data

(60) Provisional application No. 61/913,742, filed on Dec. 9, 2013.

(51) Int. Cl.
*G06K 9/00* (2006.01)

(52) U.S. Cl.
CPC . *G06K 9/00791* (2013.01); *G06K 2009/00738* (2013.01); *G06K 2209/15* (2013.01)

(58) Field of Classification Search
None
See application file for complete search history.

(56) References Cited

U.S. PATENT DOCUMENTS

| | | | |
|---|---|---|---|
| 5,948,038 A | 9/1999 | Daly et al. | |
| 6,678,413 B1 | 1/2004 | Liang et al. | |
| 6,690,294 B1 * | 2/2004 | Zierden | G08G 1/052 340/933 |
| 6,714,894 B1 | 3/2004 | Tobey et al. | |
| 6,914,541 B1 | 7/2005 | Zierden | |
| 7,348,895 B2 | 3/2008 | Lagassey | |
| 7,463,896 B2 | 12/2008 | Himmelstein | |
| 7,986,339 B2 | 7/2011 | Higgins | |
| 8,031,084 B2 | 10/2011 | Rothschild | |
| 8,134,693 B2 | 3/2012 | Coilli | |
| 8,260,533 B2 | 9/2012 | Matsur | |
| 8,310,377 B2 | 11/2012 | Sirota et al. | |
| 8,344,864 B1 | 1/2013 | Al-Mutawa | |
| 8,463,487 B2 | 6/2013 | Nielsen et al. | |
| 8,467,932 B2 | 6/2013 | Nielsen et al. | |
| 8,515,673 B2 | 8/2013 | Trinko et al. | |
| 8,531,520 B2 | 9/2013 | Stricklin et al. | |
| 8,547,250 B1 | 10/2013 | Al-Mutawa | |
| 8,560,164 B2 | 10/2013 | Nielsen et al. | |
| 8,629,786 B2 | 1/2014 | Sirota et al. | |
| 2002/0072847 A1* | 6/2002 | Trajkovic | G08G 1/0175 701/117 |
| 2004/0252193 A1* | 12/2004 | Higgins | G08G 1/0175 348/149 |
| 2008/0298654 A1* | 12/2008 | Roth | A61B 8/12 382/128 |
| 2009/0046897 A1* | 2/2009 | Rowsell | G06K 9/00785 382/107 |
| 2012/0236927 A1* | 9/2012 | Nakagawa | H04N 7/0806 375/240.01 |
| 2015/0304300 A1* | 10/2015 | Bender | H04L 12/1895 726/4 |

FOREIGN PATENT DOCUMENTS

AU 2013100998 A4 * 8/2013 ......... G06Q 30/0265

* cited by examiner

*Primary Examiner* — Siamak Harandi
*Assistant Examiner* — Mai Tran
(74) *Attorney, Agent, or Firm* — Thomas | Horstemeyer, LLP

(57) ABSTRACT

Disclosed are various embodiments for detecting and reporting improper activity, such a traffic violation. In one embodiment, a computing device receives multiple image frames from a client device. The computing device detects that a vehicle shown in at least one of the image frames is in violation of a rule. The computing device generates an evidence package based on at least one of the image frames. The computing device transmits the evidence to an evidence review device for review by an enforcement individual.

20 Claims, 10 Drawing Sheets

DETECTING AND REPORTING IMPROPER ACTIVITY INVOLVING A VEHICLE

CROSS REFERENCE TO RELATED APPLICATIONS

This application claims priority to U.S. provisional application entitled "CROWD SOURCING OF DRIVER VIOLATIONS," having Ser. No. 61/913,742 and filed Dec. 9, 2013, which is incorporated by reference herein in its entirety.

BACKGROUND

To facilitate the safe and orderly operation of vehicles on roadways, traffic laws have been adopted. A law enforcement officer may personally witness a driver violating a traffic law and issue a citation to the driver. The citation may result in a fine or jail time for the driver.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure describes various systems and methods for detecting and reporting improper activity involving one or more vehicles. As a non-limiting example, a user may position a mobile computing device on the dash of his or her vehicle. While the user is driving, the mobile computing device may collect image frames of other vehicles. The mobile computing device may perform image processing operations on the image frames to determine whether one or more of the other vehicles has performed an improper activity, such a violation of a traffic law. In alternative embodiments, the user may indicate that improper activity has occurred by selecting a button, speaking a voice command, making a hand gesture, or by providing some other type of indication. In response to detecting improper activity or receiving an indication of improper activity from the user, the mobile computing device may transmit at least a subset of the image frames and potentially other data to an evidence processing system.

The evidence processing system may receive the image frames and detect whether one or more of the image frames shows improper activity. In alternative embodiments, the evidence processing system may provide the image frames for manual review by a trained technician. If the evidence processing system detects that improper activity has occurred, or if the trained technician indicates that improper activity has occurred, the evidence processing system may generate an evidence package and transmit the evidence package to a device operated by an enforcement individual, such as a law enforcement officer.

The enforcement individual may decide whether to issue a citation to the owner of the vehicle shown in the image frames based on information in the evidence package. If the citation is issued and a monetary fine for the citation is paid, the evidence processing system may provide a promotional benefit, such as a monetary or non-monetary reward, to the user associated with the mobile computing device that captured the image frames showing the improper activity. Thus, various embodiments of the present disclosure may increase the amount of improper activity, such as traffic violations, that are detected and prosecuted. Additionally, users may be provided an incentive to use their mobile devices for monitoring.

In the following discussion, a general description of the system and its components is provided, followed by a discussion of the operation of the same.

Figure 1:
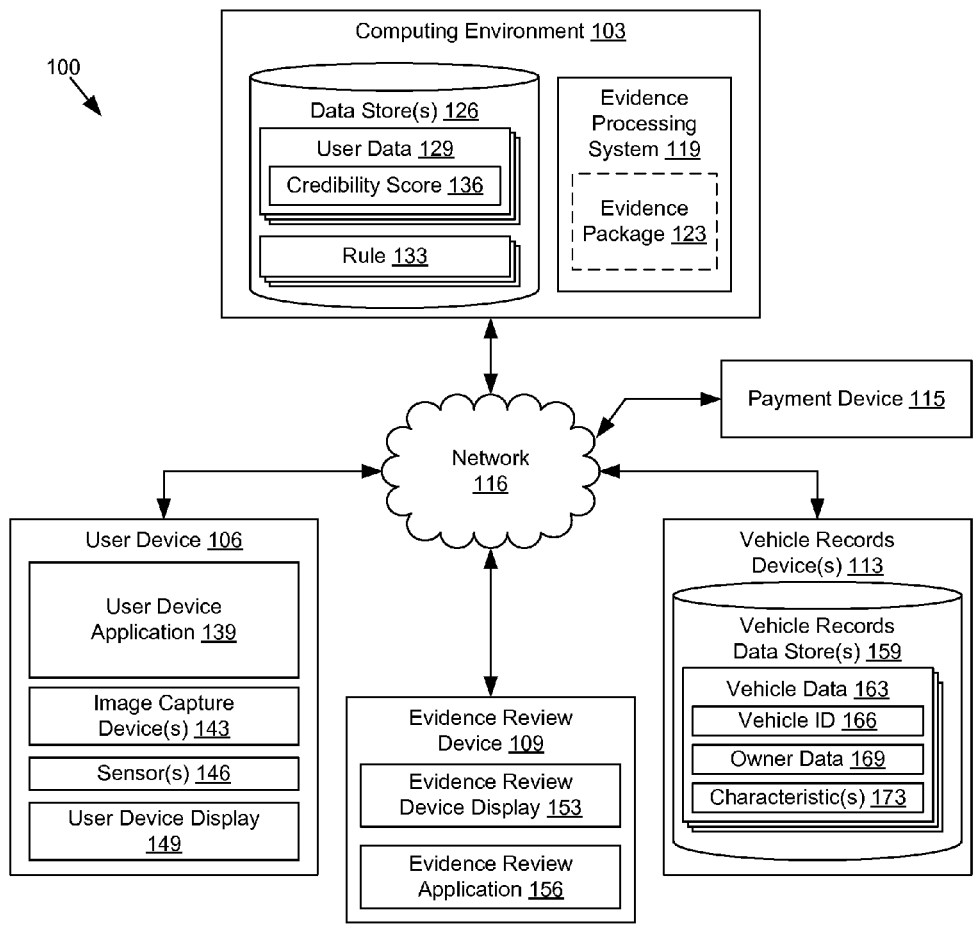
FIG. 1 is a drawing of networked environment according to various embodiments of the present disclosure.

With reference to FIG. 1, shown is a networked environment 100 according to various embodiments. The networked environment 100 shown in FIG. 1 includes a computing environment 103, a user device 106, an evidence review device 109, a vehicle records device 113, a payment device 115, and/or other devices in data communication via a network 116. The network 116 may include, for example, the Internet, one or more intranets, extranets, wide area networks (WANs), local area networks (LANs), wired networks, wireless networks, telephone networks, satellite networks, other suitable networks, and/or any combination of two or more such networks.

The computing environment 103 may comprise, for example, a server computer or any other system providing computing capability. Alternatively, the computing environment 103 may include multiple computing devices that are arranged, for example, in one or more server banks, computer banks, or other types of arrangements. For example, a plurality of computing devices together may form a cloud computing resource, a grid computing resource, and/or any other distributed computing arrangement. Such computing devices may be located in a single installation or may be distributed among many different geographical locations.

Various systems and functionality may be executed in the computing environment 103. For example, the computing environment 103 may provide and execute an evidence processing system 119 and/or other types of systems and/or functionality. The evidence processing system 119 may receive data and detect whether the data indicates that improper activity has occurred. The improper activity may or may not be civil and/or criminal activity, such as a traffic violation. As non-limiting examples, the improper activity may be improperly turning at an intersection, improperly changing a lane, entering an intersection while a stop light is active, turning or changing a lane without activating a turn signal, littering, colliding with an object, parking in an unauthorized area, and/or committing any other type of improper activity.

The evidence processing system 119 may also generate evidence packages 123. An evidence package 123 may include data, such as one or more image frames, audio data, and/or other collected information that may be transmitted to the evidence review device 109 and rendered for an enforcement individual, such as a law enforcement officer. The enforcement individual may determine whether to issue a citation on the basis of the content in the evidence package 123. In some embodiments, the evidence package 123 may purposefully lack data that can identify the user who collected the data used to generate the evidence package 123.

Various data is stored in one or more data stores 126 that are accessible to the computing environment 103. The data store 126 may include user data 129, one or more rules 133, evidence data, violator data, and/or other data. The user data 129 may represent the users who are registered with the evidence processing system 119. For example, users may provide information regarding themselves when registering to participate with the evidence processing system 119, and the evidence processing system 119 may store this information as user data 129.

Additionally, the evidence processing system 119 may generate data for a user based on his or her activities with the computing environment 103. In some embodiments, the evidence processing system 119 may generate credibility scores 136 for the users. A credibility score 136 may be a value that represents how likely data provided by a particular user will result in a valid citation being issued. For example, a user that provided data that resulted in citations 90% of the time may have a higher credibility score 136 than a user who provided data that resulted in citations 10% of the time. The evidence processing system 119 may consider the credibility score 136 in order to prioritize the processing of data. For instance, data from a user with a high credibility score 136 may be given relatively high priority in a processing queue, while data from a user with a low credibility score 136 may be discarded or assigned a lower priority in the processing queue.

The evidence processing system 119 may apply one or more rules 133 to determine whether improper activity has occurred. Some rules 133 may be generated in response to data as it is being processed, as will be described in further detail below. Other rules 133 may be predetermined 113.

The user device 106 is representative of multiple client computing devices that may be coupled to the network 116 and operated by users who, in some embodiments, have registered to participate with the evidence processing system 119. The user device 106 may comprise, for example, a processor-based system such as a computer system. Such a computer system may be embodied in the form of a mobile device, such as a cellular telephone, a music player, a tablet computer system, a web pad, a wearable computing device, a personal digital assistant, a laptop computer, or any type of mobile device. Alternatively, the user device 106 may be embodied in the form of a stationary computing device, such as a desktop computer, a security system for a building, or any other type of stationary computing device.

The user device 106 may execute a user device application 139 and/or other types of applications. The user device application 139 may be executed to capture data and to detect whether the captured data indicates that improper activity has occurred. To this end, the user device application 139 may apply the same or similar rules 133 that are applied by the evidence processing system 119. Because the user device 106 may have a slower processing speed and less memory than that which is available to the computing environment 103, the data processing by the user device application 139 may be less rigorous than the data processing by the computing environment 103. Additionally or alternatively, the user device application 139 may be configured to receive a user input that indicates that the user believes that an improper activity has occurred. Such an input may be, for example, a button being selected, a voice command, a gesture by the user, and/or any other type of input.

The user device 106 may be in communication with one or more image capture devices 143, one or more sensors 146, a user device display 149, and/or other types of components. The image capture device 143 is configured to receive light, which is then converted into image frames. In some embodiments, the image frames may form a video sequence.

The sensors 146 may include, for example, a global positioning system (GPS) receiver, an accelerometer, a microphone, and/or any other type of component to that may provide data. The microphone may be used by the user device application 139 to detect improper activity. For example, a user may speak a voice command that is received by the microphone and recognized by the user device application 139 as an indication that improper activity has occurred. As another example, the microphone may capture the sound of screeching tires or breaking glass, which may be recognized by the user device application 139 as an indication that improper activity has occurred.

The GPS receiver may receive GPS satellite signals and provide location data that represents the geographic location of the user device 106. This location data may be transmitted to the evidence processing system 119 so that the geographical location where improper activity occurred may be identified.

The user device display 149 may comprise one or more liquid crystal displays (LCDs), cathode ray tube (CRT) displays, plasma displays, and/or any other type of display that provides visual renderings of data. For example, the user device display 149 may render one or more user interfaces that facilitate a user interacting with and controlling the user device 106.

The evidence review device 109 is representative of multiple client computing devices that may be coupled to the network 116 and that may be operated by enforcement individuals, such as law enforcement officers. The evidence review device 109 may comprise, for example, a processor-based system such as a computer system. Such a computer system may be embodied in the form of a desktop computer, a laptop computer, a table computer system, a web pad, a cellular telephone, a personal digital assistant, or any type of suitable device.

The evidence review device 109 may be coupled to an evidence review device display 153 and/or other types of components. The evidence review device display 153 may comprise one or more liquid crystal displays (LCDs), cathode ray tube (CRT) displays, plasma displays, and/or any other type of display that provides visual renderings of data. For example, the evidence review device display 153 may render one or more user interfaces that facilitate an enforcement individual interacting with and controlling the evidence review device 109.

The evidence review device 109 may execute an evidence review application 156 and/or other types of applications. The evidence review application 156 may receive an evidence package 123 and render data for presentation on the evidence review device display 153. The evidence review application 156 may also receive input data that indicates whether an enforcement individual has determined to issue one or more citations as a result of the content in the evidence package 123.

The vehicle records device 113 may comprise, for example, a server computer or any other system providing computing capability. In some embodiments, the vehicle records device 113 may include multiple computing devices that are arranged in one or more server banks, computer banks, or other types of arrangements. Such computing devices may be located in a single installation or may be distributed among many different geographical locations. The vehicle records device 113 may be operated by a government agency, such as a Department of Motor Vehicles. Alternatively, the vehicle records device 113 may be operated by a private entity that has collection information for vehicles. Alternatively, the vehicle records device 113 may store data transferred from other databases, such as a database from a Department of Motor Vehicles.

The vehicle records device 113 may include one or more vehicle records data stores 159. The vehicle records data stores 159 may include vehicle data 163 that represents various information regarding vehicles. For example, each entry of vehicle data 163 may include a vehicle identifier 166, owner data 169, characteristics 173, and/or other types of data.

The vehicle identifier 166 may be used to identify a particular vehicle among other vehicles. In some embodiments, the vehicle identifier 166 may represent the characters shown on a license plate. The owner data 169 may identify the owner or entity that owns a particular vehicle. The owner data 169 may include, for example, the name and address of the owner. The characteristics 173 may identify various features of a particular vehicle. For example, the characteristics 173 may represent the make and/or model of a vehicle, the color of the vehicle, and/or any other information regarding the vehicle.

The payment device 115 is representative of multiple client computing devices that may be coupled to the network 116 and operated by users who have received citations and/or are paying fines for improper activities. The payment device 115 may comprise, for example, a processor-based system such as a computer system. Such a computer system may be embodied in the form of a desktop computer, a laptop computer, a cellular telephone, a tablet computer system, a web pad, a personal digital assistant, a payment instrument reader (e.g. a credit card reader), and/or any other type of suitable device. The payment device 115 may be configured to receive payment information and/or initiate the transfer of money from an account associated with a user who received a citation to an account associated with the evidence processing system 119.

Next, a general description of the operation of the various components of the networked environment 100 is provided. To begin, a user may register to participate with the evidence processing system 119 and install the user device application 139 on his or her user device 106. After the user device application 139 has been installed on the user device 106, the user device application 139 may be executed.

The user may position the user device 106 in a way that facilitates the collection of data using the image capture device 143 and/or one or more of the sensors 146. In one embodiment, the user device 106 may be mounted on the dash of a vehicle so that other vehicles may be within the field of view of the image capture device 143 while the user is driving. For example, the user device 106 may be positioned so that vehicles that are in front of the vehicle of the user may be within the field of view of the image capture device 143. As another example, the user may, for example, sit at a bus stop and hold the user device 106 so that the intersection of two or more roads is within the field of view of the image capture device 143. As another example, a user may temporarily leave the user device 106 at a location to autonomously collect data even in his or her absence.

The user device application 139 may then collect data, such as image frames, location data, accelerometer data, sound, and/or other types of information using the image capture device 143 and/or the sensors 146. Since the collected data may be used to issue a citation or even pursue a criminal charge, the user device application 139 may store the collected data in a memory to which the user is restricted access. For example, the collected data may be stored in random access memory (RAM) to which the user is restricted from access. In this way, the user device application 139 may prevent the user from altering the collected data. In some embodiments, the user device application 139 may use a cyclic buffer in which newly collected data is written over the oldest collected data.

While data is being collected, the user device application 139 may detect that improper activity has occurred in various ways. In one embodiment, the user of the user device 106 may provide an input to indicate that an improper activity has occurred. For example, the user may select a button, speak a voice command, or make a hand gesture that the user device application 139 recognizes as an indication that improper activity has occurred.

Additionally, the user device application 139 may detect whether the data generated by the image capture device 143 indicates that an improper activity has occurred. To this end, the user device application 139 may apply one or more rules 133 that were predefined or that are generated in response to the data that was collected by the user device application 139.

As a non-limiting example, a predefined rule 133 may specify that an improper activity has occurred if image frames show the vehicle crossing two lane divider markings within a predetermined amount of time. Such a rule 133 may be used to detect vehicle making an improper lane change. To apply this rule 133, the user device application 139 may identify a vehicle shown in one or more image frames that have been generated by the image capture device 143. The user device application 139 may also identify two lane divider markings, which define a travel lane. If the image frames show the vehicle crossing both lane divider markings within a predetermined amount of time, the user device application 139 determines that the rule 133 has been violated and that improper activity has occurred.

As a non-limiting example of a rule 133 that is generated in response to data that has been collected, the user device application 139 may detect a traffic sign shown in one or more image frames that are generated by the image capture device 143. Using optical character recognition, the user device application 139 may determine that the traffic sign indicates that vehicles are prohibited from turning right while a stop light is active. Accordingly, the user device application 139 may generate a rule 133 specifying that improper activity has occurred if one or more image frames shows a vehicle turning right while the stop light is active. To apply this rule 133, the user device application 139 may identify a stop light in one or more of the image frames and detect whether the stop light is illuminated red. If so, the user device application 139 may identify a vehicle shown in one or more of the image frames and detect whether the vehicle is shown moving across an intersection threshold shown in one or more of the image frames. If so, the evidence processing system 119 determines that the rule 133 has been violated and that improper activity has occurred.

Additionally, data collected from one or more sensors 146 may be used to detect whether an improper activity has occurred. For example, the sound of breaking glass or screeching tires collected by the microphone may indicate to the user device application 139 that improper activity has occurred. As another non-limiting example, the user device application 139 may detect that improper activity has occurred if accelerometer data indicates that the user device 106 has experienced an acceleration that is greater than a predefined amount. An acceleration of a relatively large amount may indicate that the vehicle in which the user device 106 was mounted has been involved in a collision with another object or has performed an evasive maneuver to avoid colliding with another object.

Upon detecting that an improper activity has occurred, the user device application 139 may initiate various actions. For example, the user device application 139 may prevent at least a portion of the data collected prior to the time when the improper activity was detected from being discarded. Additionally, the user device application 139 may continue to collect data subsequent to the time when the improper activity was detected.

The user device 106 may transmit at least a portion of the data collected prior to and subsequent to the time when the improper activity was detected. Additionally, the user device 106 may transmit information, such as the identity of the user of the user device 106, the time when the improper activity was detected, the location of the user device 106 when the improper activity was detected, and/or any other information that may be useful for the evidence processing system 119. In some embodiments, the user device application 139 may wait to transmit the data to the evidence processing system 119 until the user device application 139 has joined a particular type of network, such as a local area network. By waiting to transmit the data until connected to such a network, the user device application 139 may avoid transmitting data using a cellular data network that may be relatively expensive and/or have relatively low bandwidth for the user device 106.

The user device application 139 may provide an authentication mechanism for at least a portion of the data that is transmitted to the evidence processing system 119. For example, the user device application 139 may apply a hash function to at least a portion of the collected data. The hash value that is output when the hash function is applied may be transmitted to the evidence processing system 119 and used by the evidence processing system 119 to detect whether the collected data has been tampered with or manipulated, as will be described below. The user device application 139 may also encrypt at least a portion of the data that is transmitted to the evidence processing system 119. Encrypting the data may prevent unauthorized devices from accessing the content that is transmitted by the user device 106.

In some embodiments, the user device application 139 may also transmit to other user devices 106 a notification that an improper activity has been detected. The location of the user device 106 when the improper activity was detected may also be transmitted in conjunction with the notification. Other user devices 106 that receive the notification may compare their own locations to the location where the user device 106 detected the improper activity. User devices 106 that are within a predetermined distance from the improper activity may transmit data that they have been collecting to the evidence processing system 119. Since the data provided by multiple user devices 106 may include image frames or other data showing an improper activity from different viewpoints, the evidence processing system 119 may use this data to obtain more information regarding the improper activity.

After the evidence processing system 119 receives collected data from the user device 106, the evidence processing system 119 may begin processing the data. First, the evidence processing system 119 may decrypt the data using the appropriate key. If the user device application 139 provided a hash value with the data, the evidence processing system 119 may apply the hash function to at least a portion of the received data. If the hash value that results from the hash function matches the hash value that was provided by the user device application 139, the evidence processing system 119 may determine that the received data has not been tampered with or manipulated. If the hash values do not match, the evidence processing system 119 may determine that the received data has been manipulated and is not suitable for further processing. The evidence processing system 119 may discard the data and reduce the credibility score 136 of the user that provided the data if the evidence processing system 119 determines that the data has been manipulated.

After the data has been decrypted and authenticated, the evidence processing system 119 may initiate the process of detecting whether the data collected by the user device 106 shows that an improper activity occurred. In some embodiments, the evidence processing system 119 may render the collected data for manual review by one or more trained technicians. For example, the evidence processing system 119 may render audio, video, images, and/or any other content that was provided by the user device 106. If a technician believes that the rendered content shows that an improper activity has occurred, the technician may provide an input for the evidence processing system 119 to signal that the improper activity has occurred. The technician may also specify the type of improper activity, one or more reasons why the technician believes that improper activity has occurred, and/or other information. For embodiments in which a technician provides reasons why the improper activity is believed to have occurred, the evidence processing system 119 may use this information to learn how to detect improper activity in the future. For example, a technician may specify that an improper activity occurred because image frames show a vehicle turning without activating a turn signal. Using this information, the evidence processing system 119 may then automatically detect that an improper activity has occurred if image frames show a vehicle turning without activating a turn signal. Thus, one or more technicians can train the evidence processing system 119 to automatically detect one or more improper activities.

In various embodiments, the evidence processing system 119 may process and automatically detect whether the data collected by the user device application 139 indicates that an improper activity occurred. To this end, the evidence processing system 119 may perform image processing operations on the collected image frames and apply one or more rules 133 that are predefined and/or generated in response to the data that is being processed by the evidence processing system 119. Because the computing resources, such as processor speed and memory, that are available to the computing environment 103 may be greater than the computing resources in the user device 106, the data processing performed by the evidence processing system 119 may be more intensive and thorough than the data processing performed by the user device application 139.

As a non-limiting example, a predefined rule 133 may specify that an improper activity has occurred if image frames show a vehicle crossing two lane divider markings within a predetermined amount of time. To apply this rule 133, the evidence processing system 119 may identify a vehicle shown in one or more image frames in the data provided by the user device 106. The evidence processing system 119 may also identify two lane divider markings, which define a travel lane. If the image frames show the vehicle crossing both lane divider markings within a predetermined amount of time, the evidence processing system 119 determines that the predefined rule 133 has been violated and that improper activity has occurred.

As a non-limiting example of the evidence processing system 119 generating a rule 133, the evidence processing system 119 may detect a sign shown in one or more images. Using optical character recognition, the evidence processing system 119 may read the characters on the sign and determine that the sign indicates that a right turn is prohibited while a stop light is active. As a result, the evidence processing system 119 may generate a rule 133 specifying that improper activity has occurred if one or more image frames shows a vehicle turning right while the stop light is active. To apply this rule 133, the evidence processing system 119 may then identify a stop light in one or more of the image frames and detect whether the stop light is illuminated red. Additionally, the evidence processing system 119 may detect a vehicle shown in one or more of the image frames and detect whether the vehicle is shown moving across an intersection threshold shown in one or more of the image frames. If so, the evidence processing system 119 determines that this rule 133 has been violated and that improper activity has occurred.

When an improper activity has been detected by the evidence processing system 119, the image frames and/or other data associated with the improper activity may be rendered for further review by one or more trained technicians. The one or more trained technicians may provide an additional level of review and verification before an evidence package 123 is generated and/or transmitted to the evidence review device 109. Additionally, the trained technician may provide input indicating whether the evidence processing system 119 correctly identified an improper activity. If a trained technician determines that an improper activity was correctly identified by the evidence processing system 119, the one or more rules 133 and/or algorithms used to detect the improper activity may be validated and used again in subsequent processing. Alternatively, if a trained technician determines that the evidence processing system 119 incorrectly identified an activity as improper, or if the evidence processing system 119 failed to detect an improper activity, the rules 133 and/or algorithms used may be refined or discarded. In this way, the evidence processing system 119 may learn to accurately detect improper activities.

When an improper activity has been detected, the associated data may be subjected to subsequent levels of processing by the evidence processing system 119 and/or review by one or more trained technicians. Each subsequent level may subject the data to higher lever of scrutiny by the evidence processing system 119 and/or a trained technician. For example, a subsequent level of processing may involve more sophisticate rules 133 and/or processing algorithms that a previous level of processing. In this way, it may be less likely for improper activity that was incorrectly detected to result in an evidence package 123 being generated.

After an improper activity has been detected, the evidence processing system 119 may obtain information regarding the vehicle shown in one or more of the image frames that was provided by the user device 106. To this end, the evidence processing system 119 may use optical character recognition to identify the characters on the license plate of the vehicle shown in one or more of the image frames. Alternatively, a technician may manually identify and enter the license plate characters into the evidence processing system 119.

The evidence processing system 119 may then transmit a request to the vehicle records device 113 for information regarding the vehicle that corresponds to identified characters on the license plate. The vehicle records device 113 may use an Application Programming Interface (API) to facilitate the evidence processing system 119 transmitting the request and receiving the corresponding data. Upon receiving the request from the evidence processing system 119, the vehicle records device 113 may search the vehicle records data store 159 for vehicle data 163 corresponding to the vehicle identifier 166 that matches the characters provided in the request. If the requested vehicle data 163 is found by the vehicle records device 113, the vehicle data 163 may be transmitted to the evidence processing system 119.

Upon receiving the requested vehicle data 163 from the vehicle records device 113, the evidence processing system 119 may compare the received vehicle data to the vehicle shown in the image frames that were provided by the user device 106. For example, if the characteristics 173 represented in the vehicle data 163 indicate that the vehicle is a particular make, model, year, color, etc., the evidence processing system 119 may determine whether the vehicle shown in the image frames has the same features.

If the features of the vehicle shown in the image frames match the characteristics 173 represented in the vehicle data 163, the evidence processing system 119 may generate an evidence package 123. In one embodiment, the evidence package 123 is a data package that is configured to be rendered in interactive user interface. For example, the interactive user interface may facilitate an enforcement individual reviewing several image frames and then selecting a subset of the image frames for inclusion with a citation. In alternative embodiments, the evidence processing system 119 may be an electronic document, such as a Portable Document Format (PDF) file, that is configured to be rendered on the evidence review device 109. In other embodiments, the evidence processing system 119 may cause a paper version of the evidence package 123 to be printed and provided to an enforcement individual for review. In some embodiments, the evidence processing system 119 may also select and include in the evidence package 123 one or more image frames that best show the improper activity.

If the evidence package 123 comprises an electronic document or a data package, the evidence package 123 is transmitted to the evidence review device 109, which may be operated by an enforcement individual, such as a law enforcement officer. The evidence review application 156 may render the evidence package 123 on the evidence review device display 153. In some embodiments, the evidence review application 156 may facilitate the enforcement individual viewing several image frames collected by the user device 106. If the enforcement individual determines to issue a citation based on the evidence package 123, the enforcement individual may select one or more of the image frames for inclusion with the citation. In one embodiment, two image frames may be selected for inclusion with the citation.

The evidence review application 156 may also facilitate the enforcement individual generating the citation. For example, the evidence review application 156 may provide a button that the enforcement individual may select to indicate that the citation is to be issued and to provide an electronic signature of the enforcement individual on appropriate documents. The evidence review application 156 may automatically complete data fields of the citation using the vehicle data 163 obtained by the evidence processing system 119, the data provided by the user device 106, and/or other information. For example, data fields regarding the model of the vehicle, the owner of the vehicle, the time of the improper activity, the location of the improper activity, and/or any other data field of citation may be automatically completed using information that has been obtained by the evidence processing system 119. The evidence review application 156 may also facilitate the enforcement individual completing and/or modifying the data fields. After the data fields for the citation have been completed, the evidence review application 156 may cause a paper citation to be printed and mailed to the individual represented by the owner data 169. Alternatively, an electronic citation may be transmitted to the individual.

The evidence review application 156 may transmit to the evidence processing system 119 data representing whether the enforcement individual issued the citation. The evidence processing system 119 may update the credibility score 136 of the user associated with the user device 106 that provided the collected data based on whether a citation was issued. For example, the credibility score 136 may be raised if a citation was issued, or the credibility score 136 may be lowered if the evidence package 123 did not result in a citation being issued. Additionally, the evidence processing system 119 may apply machine learning techniques to improve the rules 133 and/or image processing algorithms based on whether a citation was issued.

If a citation was issued, the individual may pay a monetary fine. If a fine is paid, a payment processing device 115 may transmit to the evidence processing system 119 a notification that the monetary fine was paid. Upon receiving the notification, the evidence processing system 119 may initiate the transfer of a promotional benefit to the user associated with the user device 106 that provided the data used to issue the citation. For example, evidence processing system 119 may initiate the transfer of money to an account associated with the user. In some embodiments, the amount of money that is transferred may be a predefined percentage of the monetary fine that was paid.

Figure 2:
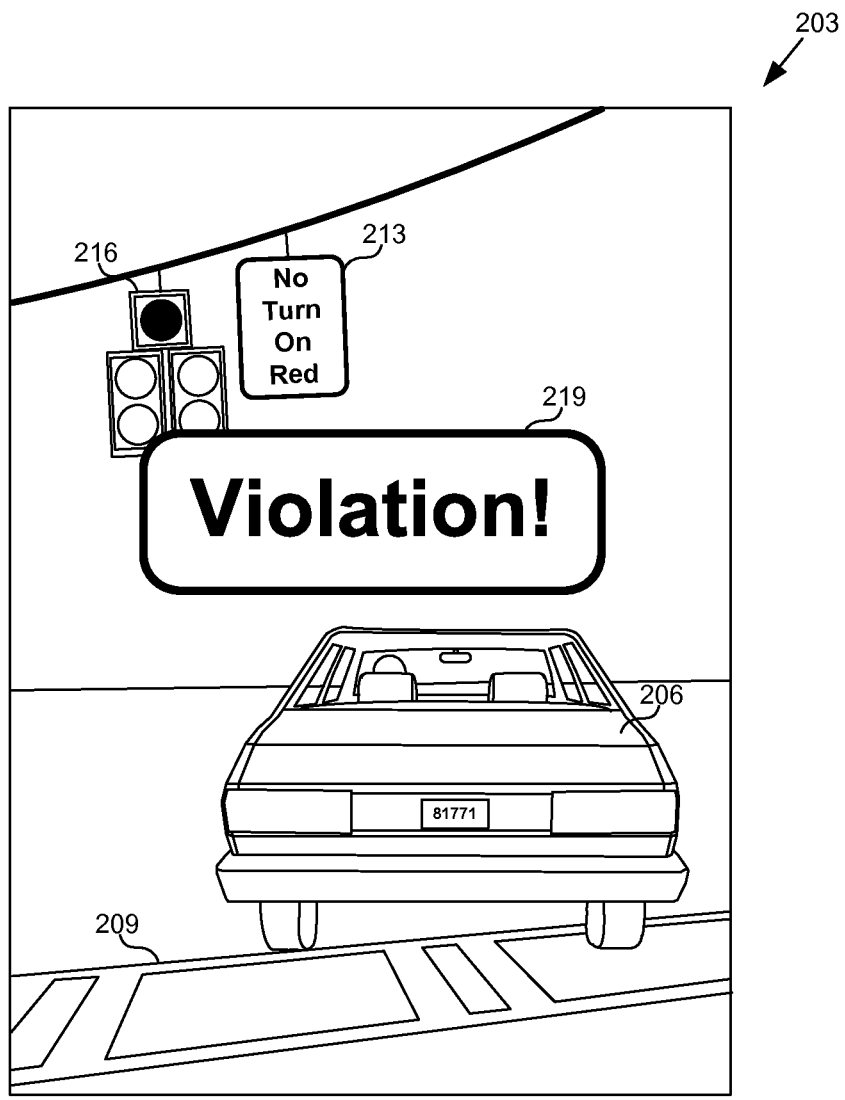
FIG. 2 is a drawing of an example of a user interface rendered by a user device in the networked environment of FIG. 1 according to various embodiments of the present disclosure.

With reference to FIG. 2, shown is a drawing of an example of a user interface 203 that may be generated by the user device application 139 (FIG. 1) and rendered for display in the user device display 149 (FIG. 1). For the embodiment shown in FIG. 2, the user device 106 (FIG. 1) has been mounted on the dash of a vehicle and positioned so that the image capture device 143 (FIG. 1) generated image frames showing another vehicle 206 that is in front of the vehicle of the user.

The user interface 203 includes a rendering of an image frame that was generated by the image capture device 143. The image frame shows the vehicle 206, an intersection threshold 209, a traffic sign 213, and a traffic light 216. Additionally, a violation notification 219 has been rendered in the user interface 203. In some embodiments, an audio notification may be generated to indicate that an improper activity has been detected. In the example shown, the user device application 139 has detected the traffic sign 213 and applied optical character recognition to learn that the traffic sign indicates that the vehicle 206 is prohibited from turning right. As such, the user device application 139 has generated a rule 133 (FIG. 1) specifying that an improper activity has occurred if the vehicle 206 crosses the intersection threshold 209 while the traffic light 216 is illuminated red.

When applying this rule 133, the user device application 139 has detected that the traffic light 216 is illuminated red. Additionally, the user device application 139 has detected that the vehicle 206 has crossed the intersection threshold 209. As such, the user device application 139 has determined that the rule 133 has been violated. Thus, the user device application 139 has detected an improper activity. In response to the improper activity being detected, the violation notification 219 has been generated and rendered in the user interface 203 to notify the user that an improper activity has been detected.

Figure 3:
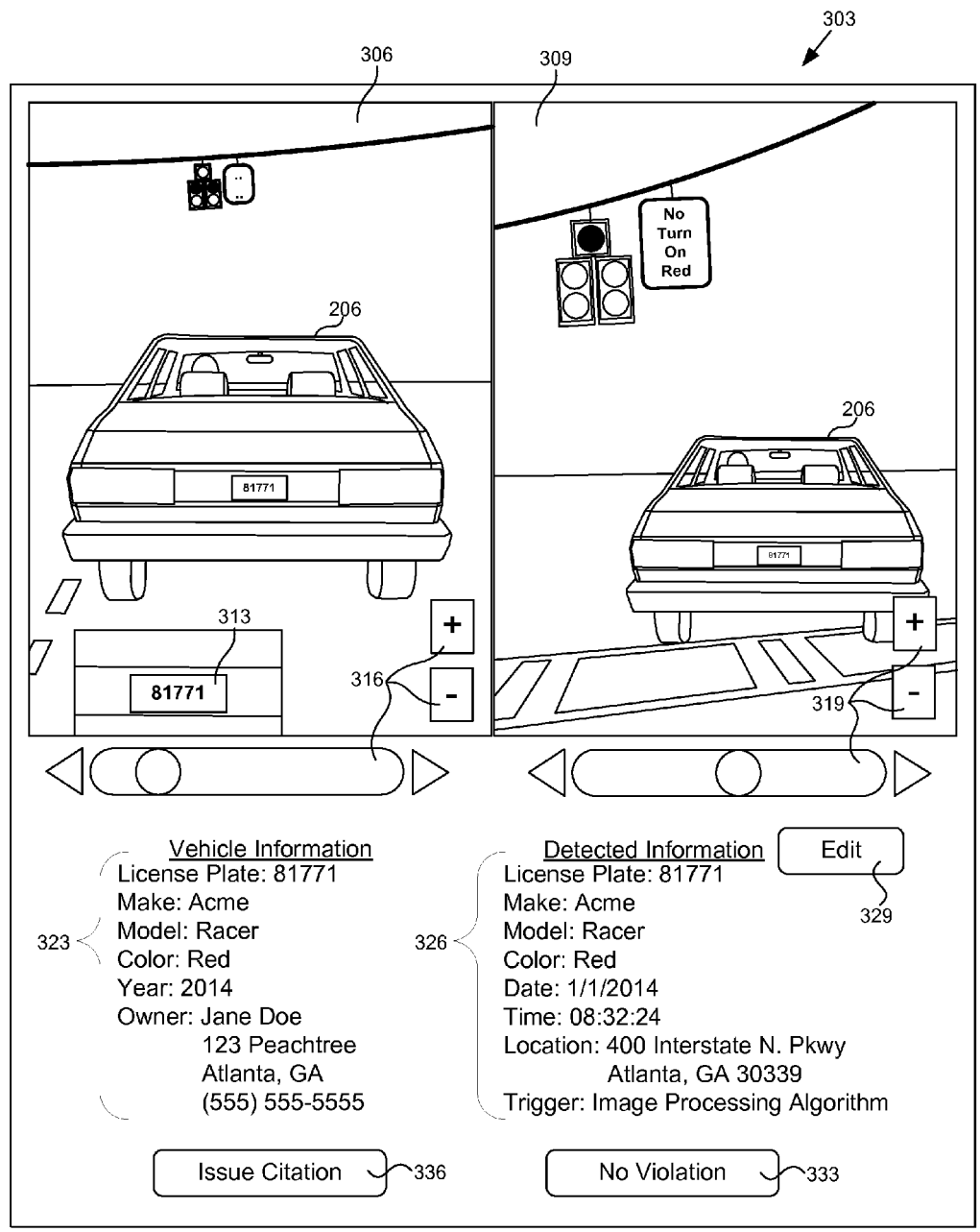
FIG. 3 is a drawing of an example of a user interface rendered by an evidence review device in the networked environment of FIG. 1 according to various embodiments of the present disclosure.

With reference to FIG. 3, shown is an example of an enforcement individual user interface 303 that may be generated by the evidence review application 156 (FIG. 1) and rendered in the evidence review device display 153 (FIG. 1). It is noted that one or more of the elements shown in the enforcement individual user interface 303 may be omitted in some embodiments. Additionally, some embodiments may purposefully lack renderings of personally identifiable information.

The enforcement individual user interface 303 shown in FIG. 3 includes renderings of a first image frame 306, a second image frame 309, and an enlargement of a license plate 313. The renderings of the first image frame 306 and the second image frame 309 show the vehicle 206 at two points in time. In particular, the first image frame 306 shows the vehicle 206 prior to when the detected improper activity occurs. Additionally, the vehicle 206 is easily identifiable in the first image frame 306. The second image frame 309 shows the vehicle 206 when the detected improper activity is occurring. The enlargement of the license plate 313 may facilitate an individual identifying the characters in the license plate 313 of the vehicle 206.

Associated with the first image frame 306 and the second image frame 309 are first control buttons 316 and second control buttons 319, respectively. The first control buttons 316 may facilitate an enforcement individual, such as a law enforcement officer, selecting one of multiple image frames to be rendered as the first image frame 306. Additionally, the first control buttons 316 may facilitate the enforcement individual causing the first image frame 306 to be zoomed in or zoomed out when rendered. Alternative embodiments may include additionally functionality, such as "zoom to selected area" functionality, scroll functionality, multi-gesture zoom functionality, and/or other functionality. The functionality may be controlled by using touch screen controls and/or any other suitable type of interface.

Similarly, the second control buttons 319 may facilitate the enforcement individual selecting one of multiple image frames to be rendered as the second image frame 309. Additionally, the second control buttons 319 may facilitate the enforcement individual causing the second image frame 309 to be zoomed in or zoomed out when rendered.

The user interface 303 in the embodiment shown in FIG. 3 also includes a vehicle information region 323 and a detected information region 326. The vehicle information region 323 may include renderings of at least a portion of the vehicle data 163 (FIG. 1) that the evidence processing system 119 obtained from the vehicle records device 113. For example, the vehicle information region 323 may show renderings of the vehicle identifier 166 (FIG. 1) for the vehicle 206, the make of the vehicle 206, the model of the vehicle 206, the color of the vehicle 206, and/or other characteristics 173 (FIG. 1) of the vehicle 206. Additionally, the vehicle information region 323 may include a rendering of the owner data 169, such as the identity of the owner of the vehicle 206 and corresponding contact information.

The detected information region 326 may include renderings of information that the evidence processing system 119 detected from the collected data that was provided by the user device 106. For example, detected features of the vehicle 206, such as the make, model, and/or color of the vehicle 206, may be shown in the detected information region 326. In one embodiment, the user interface 303 includes an indicator (not shown) that notifies the enforcement individual if data in the detected information region 326 matches data in the vehicle information region 323. Additionally, the time of the improper activity and location where the improper activity occurred may be shown in the detected information region 326. The detected information region 326 may also show the type of detection mechanism that was used by the user device application 139 and/or the evidence processing system 119 to detect the improper activity. In the embodiment shown in FIG. 3, the detected information region 326 indicates that an image processing algorithm was used to detect the improper activity. In alternative embodiments, the detected information region 326 may show that a user indicated that the improper activity occurred by, for example, selecting a button, speaking a voice command, and/or providing any other type of input.

An edit button 329 is associated with the detected information region 326 in the user interface 303 shown in FIG. 3. An enforcement individual may select the edit button 329 and edit one or more data fields in the detected information region 326. For example, the enforcement individual may correct information in the data field that indicates the detected color of the vehicle 206.

If the enforcement individual determines not to issue a citation, the enforcement individual may select the no violation button 333 provided in the user interface 303. In response to the no violation button 333 being selected, the evidence review application 156 may discard the evidence package 123 that was received. In addition, the evidence review application 156 may provide to the evidence processing system 119 a notification that a citation was not issued. The evidence processing system 119 may update the credibility score 136 for the corresponding user data 129 (FIG. 1) and/or update the algorithms and/or rules 133 that were used to generate the evidence package 123.

If the enforcement individual determines to issue a citation, the enforcement individual may select the issue citation button 336. In response to the issue citation button 336 being selected, the evidence review application 156 may cause a paper citation to be printed and sent to an individual, such as the owner of the vehicle 206 identified using the vehicle data 163 from the vehicle records device 113. Alternatively, the evidence review application 156 may transmit an electronic citation to the individual. In addition, the evidence review application 156 may provide to the evidence processing system 119 a notification that the citation was issued. The evidence processing system 119 may update the credibility score 136 for the corresponding user and/or update the algorithms and/or rules 133 that were used to generate the evidence package 123.

Figure 4:
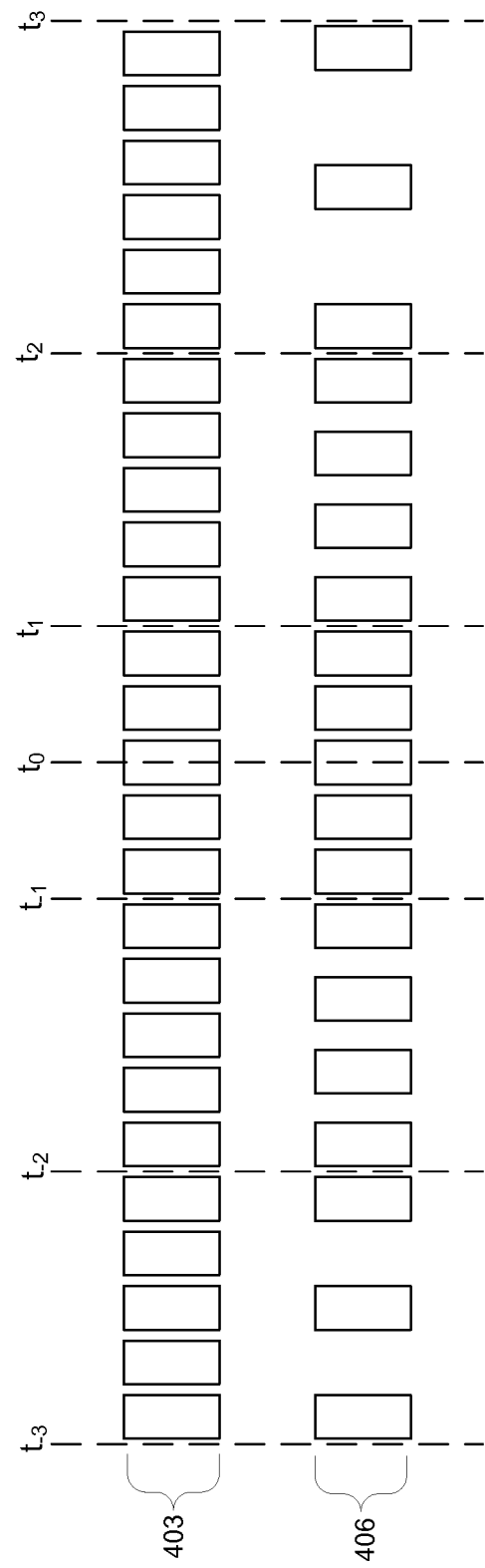
FIG. 4 is a drawing representing an example of image frames generated and selectively transmitted by a user device in the networked environment of FIG. 1 according to various embodiments of the present disclosure.

With reference to FIG. 4, shown is a drawing representing an example of image frames that may be generated and selectively transmitted by the user device 106 (FIG. 1). The top row of blocks represent image frames, referred to hereinafter as generated image frames, that are generated by the image capture device 143 from time $t_{-3}$ to time $t_3$ and provided to the user device application 139. The bottom row of blocks represent the subset of the generated image frames 403, referred to hereinafter as transmitted image frames 406, that may be transmitted from the user device 106 to the evidence processing system 119 (FIG. 1). The quantity of blocks shown for a given length of time represents a relative frame rate for the generated image frames 403 and the transmitted image frames 406.

The image capture device 143 may capture and/or provide the generated image frames 403 at a particular frame rate. For example, the generated image frames 403 may be captured and/or provided at N frames per second, where N is a predefined number. The user device application 139 may store the generated image frames 403 in a cyclic buffer that is initially empty. Newly generated image frames 403 are added and old generated image frames 403 may be removed. In one embodiment, the generated image frames 403 are added and deleted as described with respect to FIG. 4.

Because it may be inefficient to transmit all of the generated image frames 403 to the evidence processing system 119 through the network 116 (FIG. 1), various embodiments of the present disclosure transmit a selected portion of the generated image frames 403 based on the time when the improper activity was detected. In FIG. 4, the time $t_0$ represents the point in time when an improper activity was detected. The times $t_{-3}$-$t_{-1}$ represent points in time that occurred prior to time $t_0$, and the times $t_1$-$t_3$ represent points in time that occurred after time $t_0$.

Because the time window between time $t_{-1}$ and time $t_1$ may include a relatively high amount of information relevant to the detected improper activity, the user device application 139 may select all of the generated image frames 403 to be transmitted to the evidence processing system 119. As such, the frame rate of the transmitted image frames 406 within the time window from time $t_{-1}$ to time $t_1$ may be the same frame rate N at which the generated image frames 403 were captured and/or provided. Since the points in time that are relatively far from the time $t_0$ may be less likely to include information relevant to the detected improper activity, the user device application 139 may select fewer of those generated image frames 403 to be transmitted to the evidence processing system 119. Thus, in the embodiment represented in FIG. 4, the transmitted image frames 406 from time window from time $t_{-3}$ to time $t_{-2}$ have a lower frame rate than the frame rate of the transmitted image frames 406 from the time window from time $t_{-2}$ to time $t_{-1}$. Additionally, the transmitted image frames 406 from time window from time $t_{-2}$ to time $t_{-1}$ have a lower frame rate than the frame rate of the transmitted image frames 406 from the time window from time $t_{-1}$ to time $t_0$. Similarly, the transmitted image frames 406 from time window from time $t_0$ to time $t_1$ have a lower frame rate than the frame rate of the transmitted image frames 406 from the time window from time $t_1$ to time $t_2$, and the transmitted image frames 406 from time window from time $t_2$ to time $t_3$ have a lower frame rate than the frame rate of the transmitted image frames 406 from the time window from time $t_1$ to time $t_2$. Thus, the generated image frames 403 that may eventually be transmitted as transmitted image frames 406 may be selectively reduced as compared to embodiments in which all of the generated image frames 403 are transmitted as transmitted image frames 406.

Figure 5:
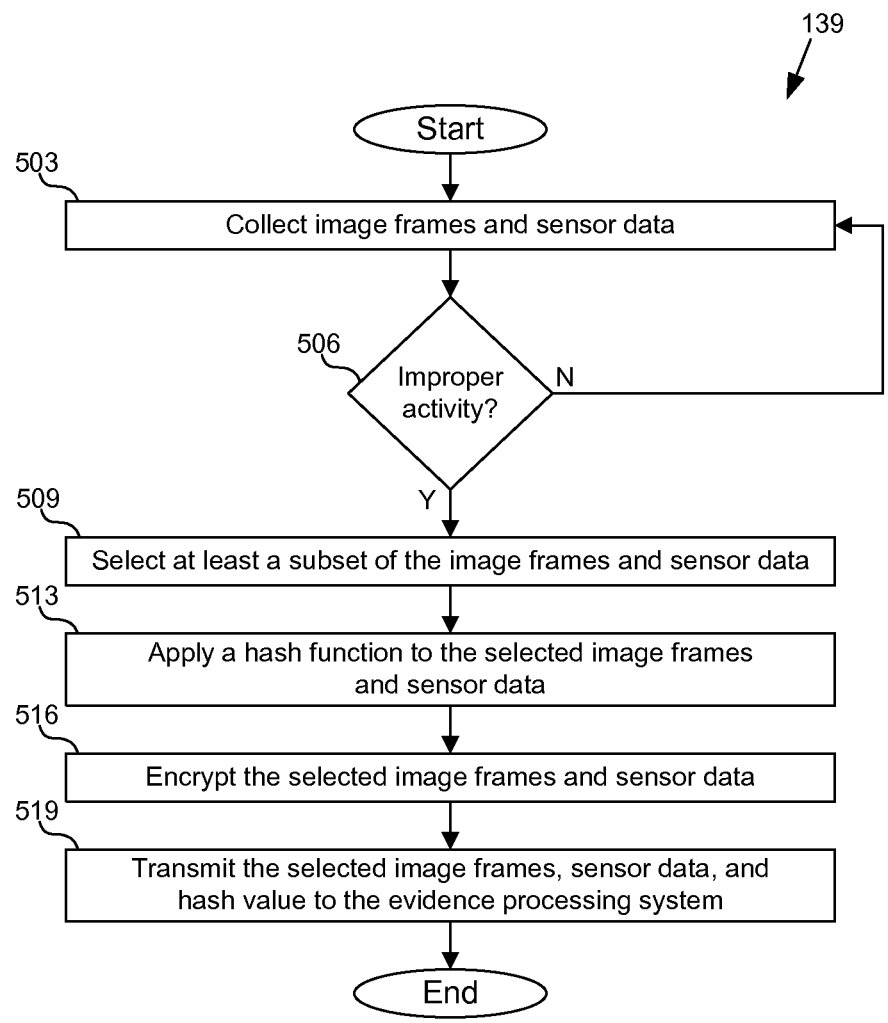
FIG. 5 is a flowchart representing an example of functionality implemented by a user device application executed in a user device in the networked environment of FIG. 1 according to various embodiments of the present disclosure.

With reference to FIG. 5, shown is a flowchart that represents an example of the operation of a portion of the user device application 139 according to various embodiments. It is understood that the flowchart of FIG. 5 provides merely an example of the many different types of functional arrangements that may be employed to implement the operation of the user device application 139 as described herein. As an alternative, the flowchart of FIG. 5 may be viewed as depicting an example of steps of a method implemented in the user device 106 (FIG. 1) according to one or more embodiments.

Beginning with box 503, the user device application 139 collects image frames provided by the image capture device 143 (FIG. 1) and/or sensor data provided by one or more sensors 146 (FIG. 1), such as remotely generated GPS location data and/or other data. At box 506, the user device application 139 detects whether an improper activity has occurred. In some embodiments, user input, such as a button selection or voice command, may indicate that improper activity has occurred. In other embodiments, the user device application 139 may apply one or more rules 133 (FIG. 1) to the image frames and/or sensor data that is being collected in order to automatically detect an improper activity, as discussed above.

If improper activity is not detected, the user device application 139 returns to box 503, and the process is repeated as shown. Otherwise, if an improper activity is detected, the user device application 139 moves from box 506 to box 509 and selects at least a subset of the image frames and sensor data that was collected. A hash function is then applied to the selected image frames and/or sensor data in box 513. As discussed above, the hash function may be used as an authentication mechanism for the data that is provided to the evidence processing system 119 (FIG. 1). Additionally, at box 516, the selected image frames and/or sensor data is encrypted.

The user device application 139 then moves to box 519 and transmits the encrypted image frames, sensor data, and hash value to the evidence processing system 119. Thereafter, the process ends.

Figure 6A:
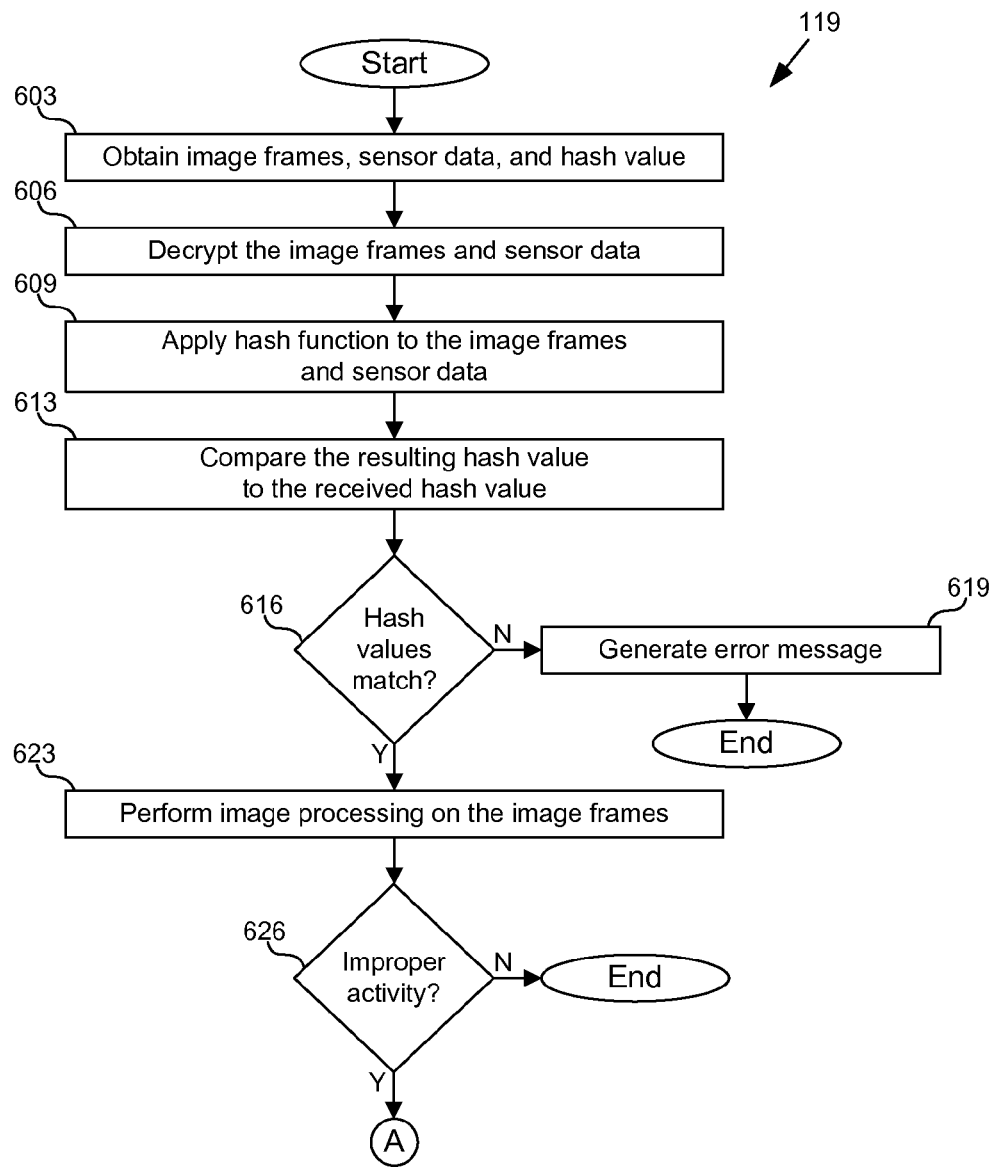
FIGS. 6A-6B are a flowchart representing an example of functionality implemented by an evidence processing system executed in a computing environment in the networked environment of FIG. 1 according to various embodiments of the present disclosure.
Figure 6B:
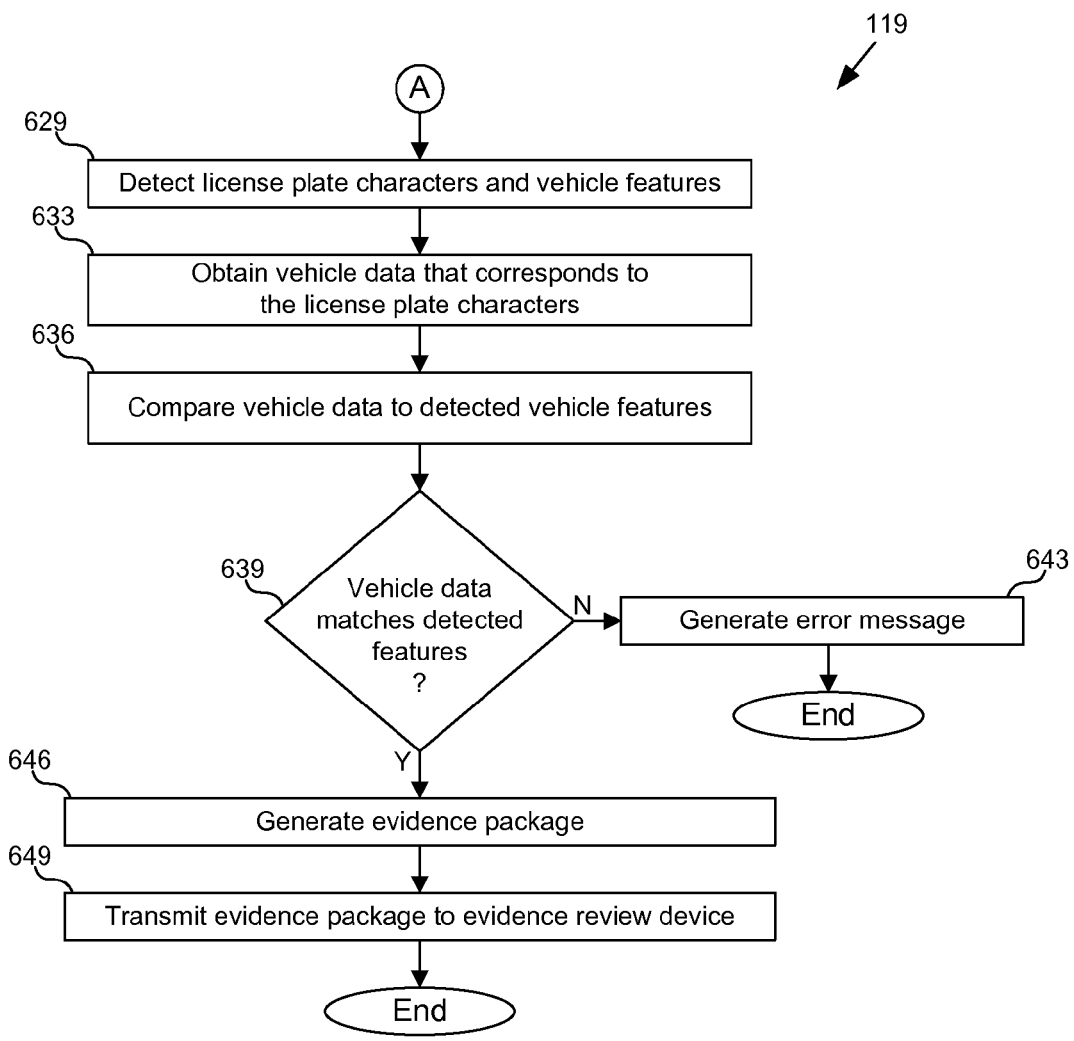

With reference to FIGS. 6A-6B, shown is a flowchart that represents an example of the operation of a portion of the evidence processing system 119 according to various embodiments. It is understood that the flowchart of FIGS. 6A-6B provides merely an example of the many different types of functional arrangements that may be employed to implement the operation of the evidence processing system 119 as described herein. As an alternative, the flowchart of FIGS. 6A-6B may be viewed as depicting an example of steps of a method implemented in the computing environment 103 (FIG. 1) according to one or more embodiments.

Beginning with box 603, the evidence processing system 119 obtains the image frames, sensor data, hash value, and/or other information from the user device 106 (FIG. 1). In box 606, the image frames and sensor data are decrypted. The evidence processing system 119 then applies the hash function to the image frames and sensor data, as shown in box 609. At box 613, the resulting hash value is compared to the hash value that was provided by the user device 106 to authenticate the data. If the hash values do not match at box 616, the evidence processing system 119 moves to box 619 and generates an error message and the data received from the user device 106 may be discarded. In some embodiments, a credibility score 136 for the user associated with the user device 106 is lowered as a result of the hash values being different.

If the hash values match, the evidence processing system 119 moves from box 616 to box 623 and performs image processing on the image frames. To this end, the evidence processing system 119 may apply one or more rules 133, as discussed above. If no improper activity is detected at box 626, the process ends. In some embodiments, the credibility score 136 (FIG. 1) of the user associated with the user device 106 may be reduced. Otherwise, if improper activity is detected, the evidence processing system 119 moves from box 626 to box 629.

At box 629, the evidence processing system 119 analyzes the image frames and detects the license plate characters and vehicle features that are shown in one or more of the image frames. The evidence processing system 119 then moves to box 633 and obtains from the vehicle records device 113 (FIG. 1) the vehicle data 163 (FIG. 1) that corresponds to the license plate characters. As shown at box 636, the evidence processing system 119 then compares the vehicle data 163 to the vehicle features that were detected. For example, the evidence processing system 119 may detect whether the make, model, color, etc., of the vehicle represented in the vehicle data 163 matches the make, model, color, etc., of that was detected in the image frames.

At box 639, the evidence processing system 119 determines whether the vehicle data 163 matches the detected vehicle features. If the vehicle data 163 does not closely match the detected vehicle features, the evidence processing system 119 moves to box 643, generates an error message, and the process ends or further review is prompted. The error message may prompt a technician to perform a manual review of the image frames and/or other data.

If the vehicle data 163 matches the detected vehicle features, the evidence processing system 119 moves from box 639 to box 646 and generates an evidence package 123 (FIG. 1). The evidence package 123 may include one or more image frames, audio data, at least a portion of the vehicle data 163, and/or other information. In some embodiments, the evidence package 123 lacks data that identifies the user associated with the user device 106.

As shown in box 649, the evidence package 123 is then transmitted to the evidence review device 109 (FIG. 1) for review by an enforcement individual. Thereafter, the process ends.

Figure 7:
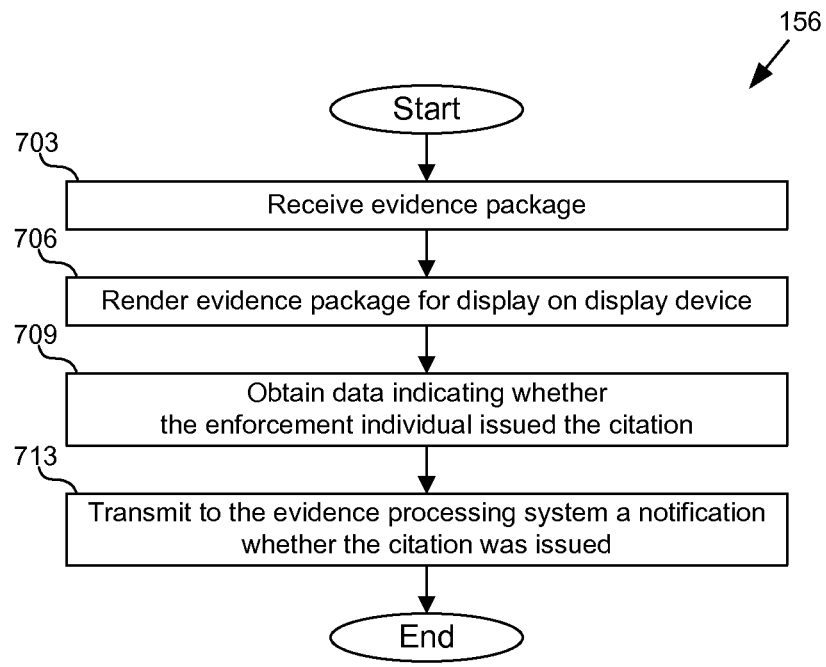
FIG. 7 is a flowchart representing an example of functionality implemented by an evidence review application executed in an evidence review device in the networked environment of FIG. 1 according to various embodiments of the present disclosure.

With reference to FIG. 7, shown is a flowchart that represents an example of the operation of a portion of the evidence review application 156 according to various embodiments. It is understood that the flowchart of FIG. 7 provides merely an example of the many different types of functional arrangements that may be employed to implement the operation of the evidence review application 156 as described herein. As an alternative, the flowchart of FIG. 7 may be viewed as depicting an example of steps of a method implemented in the evidence review device 109 (FIG. 1) according to one or more embodiments.

Beginning at box 703, the evidence review application 156 receives the evidence package 123 (FIG. 1) from the evidence processing system 119 (FIG. 1). The evidence package 123 is then rendered for display on the evidence review device display 153 (FIG. 1), as shown at box 706. As shown at box 709, the evidence review application 156 obtains input data indicating whether the enforcement individual issued the citation. In one embodiment, this input data may generated in response to the enforcement individual selecting the issue citation button 336 (FIG. 3) of the user interface 303 (FIG. 3). The evidence review application 156 then moves to box 713 and transmits to the evidence processing system 119 a notification whether the citation was issued. Thereafter, the process ends.

Figure 8:
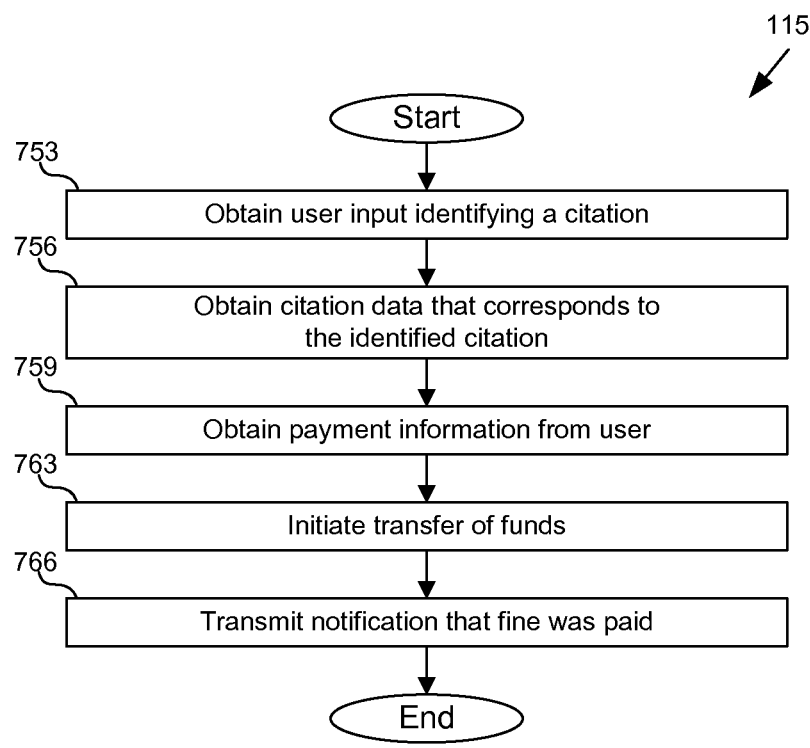
FIG. 8 is a flowchart representing an example of functionality implemented by a payment device in the networked environment of FIG. 1 according to embodiments of the present disclosure.

With reference to FIG. 8, shown is a flowchart that represents an example of the operation of a portion of the payment device 115 according to various embodiments. It is understood that the flowchart of FIG. 8 provides merely an example of the many different types of functional arrangements that may be employed to implement the operation of the payment device 115 as described herein. The flowchart of FIG. 8 may be viewed as depicting an example of steps of a method implemented in the payment device 115 according to one or more embodiments.

Beginning at box 753, the payment device 115 obtains user input that identifies a citation. For example, a user, such as the owner of a vehicle shown in one or more image frames, may be provided with a physical or electronic citation, and the user may input a citation identifier that is shown on the citation. At box 756, the payment device 115 obtains citation data that corresponds to the citation that was identified at box 753. The citation data may be obtained from the evidence processing system 119 (FIG. 1), the evidence review device 109 (FIG. 1), the vehicle records device 113 (FIG. 1), and/or any other device that has stored information regarding the identified citation. The citation data that is obtained may identify the amount of the fine that is owed due to the citation.

As shown at box 759, the payment device 115 then obtains payment information from the user. In some embodiments, the user may provide an account number and/or verification information. In other embodiments, the user may provide a username and password to sign into a payment service. After the payment information has been obtained, the payment device 115 initiates the transfer of funds for the amount of the fine that is owed due to the citation. The payment device 115 then moves to box 766 and transmits a notification to the evidence processing system 119 that the fine has been paid. Thereafter, the process ends.

Figure 9:
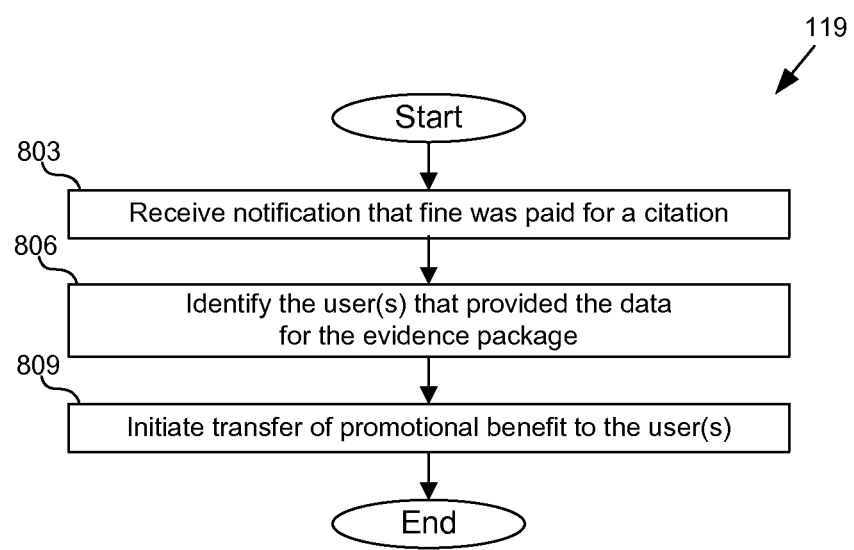
FIG. 9 is a flowchart representing another example of functionality implemented by the evidence processing system executed in the computing environment in the networked environment of FIG. 1 according to various embodiments of the present disclosure.

With reference to FIG. 9, shown is a flowchart that represents an example of the operation of another portion of the evidence processing system 119 according to various embodiments. It is understood that the flowchart of FIG. 9 provides merely an example of the many different types of functional arrangements that may be employed to implement the operation of the evidence processing system 119 as described herein. As an alternative, the flowchart of FIG. 9 may be viewed as depicting an example of steps of a method implemented in the computing environment 103 (FIG. 1) according to one or more embodiments.

Beginning at box 803, the evidence processing system 119 receives a notification that a fine was paid for a citation. In some embodiments, the notification may be provided by a computing device that is operated in association with a traffic court or other governmental entity. At box 806, the evidence processing system 119 identifies the one or more users who provided the collected data that was used to generate the evidence package 123 (FIG. 1) that led to the citation being issued. The evidence processing system 119 then initiates the transfer of a promotional benefit to the one or more identified uses, as shown at box 809. For example, the promotional benefit may be a monetary award, and the evidence processing system 119 may initiate a payment transfer to an account associated with a user. If multiple users provided data that was used in the evidence package 123, the promotional benefit may be divided in various ways. For example, each user who provided the data may receive a pro rata portion of a predefined percentage of the fine that was paid. In other embodiments, the user who first provided the data may be provided the entire promotional benefit. Thereafter, the process ends.

Figure 10:
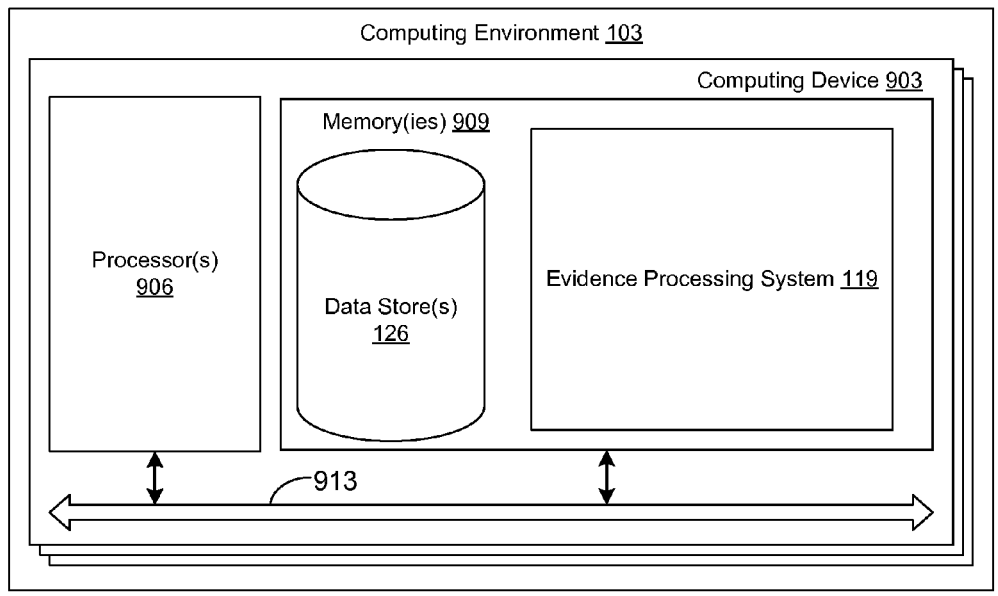
FIG. 10 is a schematic block diagram that provides an example illustration of a user device in the networked environment of FIG. 1 according to various embodiments of the present disclosure.

With reference to FIG. 10, shown is a schematic block diagram of the computing environment 103 according to an embodiment of the present disclosure. The computing environment 103 shown includes one or more computing devices 903. Each computing device 903 includes at least one processor circuit that may include one or more processors 906 and one or more memories 909, both of which are coupled to a local interface 913. As such, each computing device 903 may comprise, for example, at least one server computer or like device. The local interface 913 may comprise, for example, a data bus with an accompanying address/control bus or any other bus structure.

Stored in the memory 909 are both data and several components that are executable by the processor 906. In particular, stored in the memory 909 and executable by the processor 906 is the evidence processing system 119 and potentially other applications. Also stored in the memory 909 may be the data store 126 and other data. In addition, an operating system may be stored in the memory 909 and executable by the processor 906.

Figure 11:
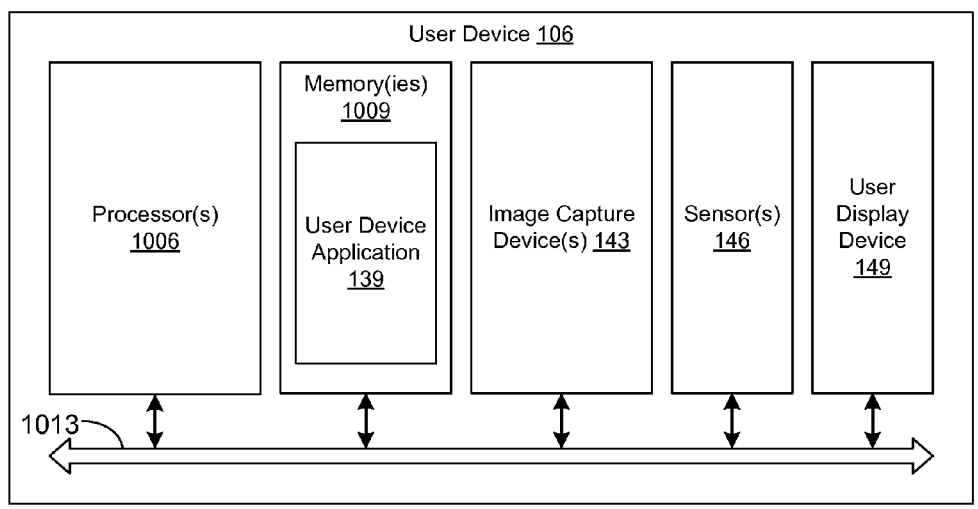
FIG. 11 is a schematic block diagram that provides an example illustration of a computing environment in the networked environment of FIG. 1 according to various embodiments of the present disclosure.

With reference to FIG. 11 shown is a schematic block diagram of the user device 106 according to an embodiment of the present disclosure. The user device 106 shown includes at least one processor circuit that may include one or more processors 1006 and one or more memories 1009, both of which are coupled to a local interface 1013. One or more image capture devices 143, sensors 146, and or user device displays 149 may be coupled to the local interface 1013. The local interface 1013 may comprise, for example, a data bus with an accompanying address/control bus or any other bus structure.

Stored in the memory 1009 are both data and several components that are executable by the processor 1006. In particular, stored in the memory 1009 and executable by the processor 1006 is the user device application 139 and potentially other applications. In addition, an operating system may be stored in the memory 1009 and executable by the processor 1006.

It is understood that there may be other applications that are stored in the memories 909 and 1009 and are executable by the processors 906 and 1006, respectively, as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components may be stored in the memories 909 and 1009 and be executable by the processors 906 and 1006, respectively. In this respect, the term "executable" means a program file that is in a form that can ultimately be run by one or more of the processor 906 and 1006. Examples of executable programs may be, for example, a compiled program that can be translated into machine code in a format that may be loaded into a random access portion of one or more of the memories 909 and 1009 and run by one or more of the processors 906 and 1006, source code that may be expressed in proper format such as object code that is capable of being loaded into a random access portion of the one or more of the memories 909 and 1009 and executed by one or more of the processors 906 and 1006, or source code that may be interpreted by another executable program to generate instructions in a random access portion of one or more of the memories 909 and 1009 to be executed by one or more of the processors 906 and 1006, etc. An executable program may be stored in any portion or component of one or more of the memories 909 and 1009 including, for example, random access memory (RAM), read-only memory (ROM), a hard drive, a solid-state drive, a USB flash drive, a memory card, an optical disc, a floppy disk, a magnetic tape, or any other suitable type of memory.

The memories 909 and 1009 may include both volatile and nonvolatile memory and data storage components. Volatile components are those that do not retain data values upon loss of power. Nonvolatile components are those that retain data upon a loss of power. Thus, the memories 909 and 1009 may comprise, for example, random access memory (RAM), read-only memory (ROM), a hard disk drive, a solid-state drive, a USB flash drive, a memory card accessed via a memory card reader, a floppy disk accessed via a floppy disk drive, an optical disc accessed via an optical disc drive, a magnetic tape accessed via a tape drive, another memory component, or any combination of two or more of these memory components. In addition, the RAM may comprise, for example, static random access memory (SRAM), dynamic random access memory (DRAM), or magnetic random access memory (MRAM) and other such components. The ROM may comprise, for example, a programmable read-only memory (PROM), an erasable programmable read-only memory (EPROM), an electrically erasable programmable read-only memory (EEPROM), or other like memory component.

Also, each of the processors 906 and 1006 may represent multiple processors and/or multiple processor cores, and each of the memories 909 and 1009 may represent multiple memories that operate in parallel processing circuits, respectively. In such a case, each of the local interfaces 913 and 1013 may be an appropriate network that facilitates communication between any two of the respective multiple processors 906 and 1006, between any processor 906 and 1006 and any of the respective memories 909 and 1009, or between any two of the respective memories 909 and 1009, etc. The each of local interfaces 913 and 1013 may comprise additional systems, such as a load balancing system, designed to coordinate this communication. The processors 906 and 1006 may be of electrical or of some other available construction.

Although the evidence processing system 119, the user device application 139, the evidence review application 156 (FIG. 1), and other various systems described herein may be embodied in software or code executed by general purpose hardware as discussed above, the same may be embodied in dedicated hardware or a combination of software/general purpose hardware and dedicated hardware. If embodied in dedicated hardware, each application or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5, 6A-6B, and 7-9 show the functionality and operation of portions of the evidence processing system 119, the user device application 139, and the evidence review application 156, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as one or more of the processors 906 and 1006 in a computer system or other system. The machine code may be converted from the source code, etc. If embodied in hardware, each block may represent a circuit or a number of interconnected circuits to implement the specified logical function(s).

Although the flowcharts of FIGS. 5, 6A-6B, and 7-9 show a specific order of execution, it is understood that the order of execution may differ from that which is depicted. For example, the order of execution of two or more boxes may be switched relative to the order shown. Also, two or more boxes shown in succession in flowcharts of FIGS. 5, 6A-6B, and 7-9 may be executed concurrently or with partial concurrence. Further, in some embodiments, one or more of the boxes shown in flowcharts of FIGS. 5, 6A-6B, and 7-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the evidence processing system 119, the user device application 139, and the evidence review application 156, that comprises software or code can be embodied in any non-transitory computer-readable medium for use by or in connection with an instruction execution system such as, for example, one or more of the processors 906 and 1006 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the evidence processing system 119, the user device application 139, and the evidence review application 156, may be implemented and structured in a variety of ways. For example, one or more applications described may be implemented as modules or components of a single application. Further, one or more applications described herein may be executed in shared or separate devices or a combination thereof. For example, a plurality of the applications described herein may execute in the same computing device 903, or in multiple computing devices in the same computing environment 103. Additionally, it is understood that terms, such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one server device; and
    an evidence processing system executable in the at least one server device, wherein when executed the evidence processing system causes the at least one server device to at least:
        obtain a plurality of image frames from a mobile phone device, wherein at least one of the image frames shows a vehicle;
        detect a vehicle feature shown in at least one of the image frames, a plurality of characters of a license plate shown in at least one of the image frames, and whether at least one of the image frames shows the vehicle in violation of a traffic rule;
        obtain, from a vehicle records device, vehicle data corresponding to the characters of the license plate;
        determine whether the vehicle feature detected in at least one of the image frames matches a characteristic identified in the vehicle data;
        generate an evidence package using at least one of the image frames;
        transmit the evidence package to a computing device for review by an enforcement individual; and
        adjust a credibility score of a user associated with the mobile phone device in response to receiving a notification that a citation is issued based at least in part on the evidence package.

2. The system of claim 1, wherein when executed the evidence processing system further causes the at least one server device to at least:
    initiate a payment to the user responsive to the notification.

3. The system of claim 1, wherein the image frames are obtained by the evidence processing system responsive to an application executed in the mobile phone device detecting that the vehicle violated the traffic rule.

4. The system of claim 1, wherein:
    a first temporal portion of the image frames is associated with a first frame rate; and
    a second temporal portion of the image frames is associated with a second frame rate that is higher than the first frame rate, the second temporal portion of the images frames being subsequent to the first temporal portion of the image frames.

5. The system of claim 4, wherein:
    a third temporal portion of the image frames is associated with a third frame rate that is lower than the second frame rate, the third temporal portion of the image frames being subsequent to the second temporal portion of the image frames.

6. A method, comprising:
    receiving, using at least one computing device, a plurality of image frames obtained by a mobile phone device, wherein at least one of the image frames shows a vehicle in violation of a traffic rule;
    obtaining, using at least one computing device, vehicle data corresponding to a license plate detected in at least one of the image frames, the vehicle data being obtained from a vehicle records device;
    determining, using at least one computing device, whether a vehicle feature detected in at least one of the image frames matches a characteristic identified in the vehicle data;
    generating, using the at least one computing device, an evidence package based on at least one of the image frames;
    transmitting, using the at least one computing device, the evidence package to an evidence review device for review of the evidence package by an enforcement individual;
    obtaining, using the at least one computing device, a notification that a citation was issued in connection with the evidence package; and
    adjusting, using the at least one computing device, a credibility score associated with the mobile phone device based on the notification that the citation was issued.

7. The method of claim 6, further comprising detecting, using the at least one computing device, whether at least one of the image frames shows the vehicle making an improper turn.

8. The method of claim 6, wherein the evidence package is transmitted to the evidence review device in response to the at least one computing device detecting that at least one of the image frames shows the vehicle in violation of the traffic rule.

9. The method of claim 6, further comprising providing, using the at least one computing device, the evidence package with information based on the vehicle record.

10. The method of claim 6, wherein:
a first temporal portion of the image frames is associated with a first frame rate; and
a second temporal portion of the image frames is associated with a second frame rate that is higher than the first frame rate, the second temporal portion of the image frames being subsequent to the first temporal portion of the image frames.

11. A system, comprising:
a phone device; and
an application executable in the phone device, wherein when executed, the application causes the phone device to at least:
collect a plurality of image frames;
obtain an indication that a vehicle shown in at least one of the image frames is involved with an improper activity; and
transmit at least a subset of the image frames to an evidence processing system that obtains vehicle data corresponding to a license plate detected in at least one of the image frames, determines whether a vehicle feature detected in at least one of the image frames matches a characteristic identified in the vehicle data, and adjusts a credibility score of a user associated with the phone device based at least in part on whether the transmitted image frames result in a citation.

12. The system of claim 11, wherein the application further comprises logic that analyzes at least a portion of the image frames and automatically generates the indication.

13. The system of claim 11, wherein the indication is provided by a user.

14. The system of claim 13, wherein the indication is a voice command.

15. The system of claim 13, wherein the indication is a user gesture.

16. The system of claim 11, wherein the application further comprises logic that obtains data indicating that a promotional benefit has been received as a result of the at least the subset of the image frames being transmitted to the evidence processing system.

17. The system of claim 1, wherein the evidence package indicates whether the vehicle feature detected in at least one of the image frames matches the characteristic identified in the vehicle data.

18. The system of claim 1, wherein when executed the evidence processing system further causes the at least one server device to at least lower the credibility score in response to a failure to authenticate data corresponding to the plurality of image frames obtained from the mobile phone device.

19. The system of claim 1, wherein when executed the evidence processing system further causes the at least one server device to at least adjust the credibility score when no citation is issued in connection with the evidence package.

20. The system of claim 11, wherein the evidence processing system increases the credibility score when the transmitted image frames result in a citation.

* * * * *